Feb. 10, 1931.  J. BOTKA, JR  1,791,707
ATTACHMENT FOR AEROPLANES
Filed Sept. 13, 1929
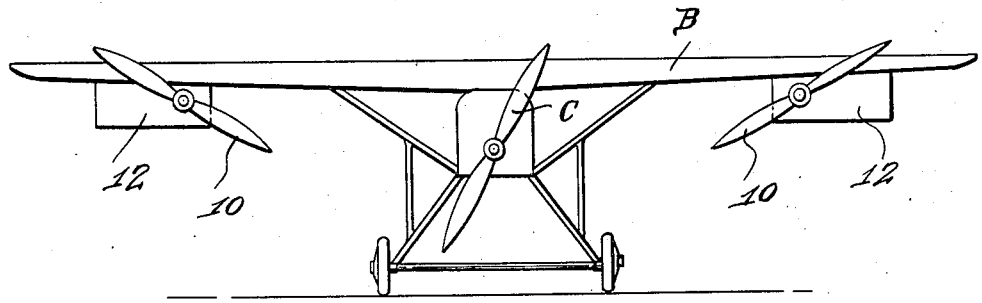
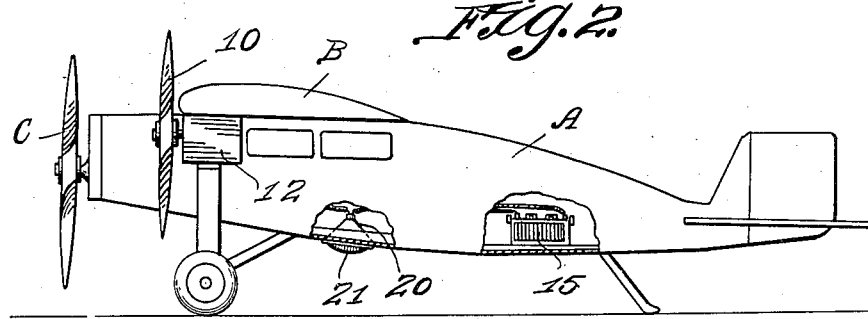
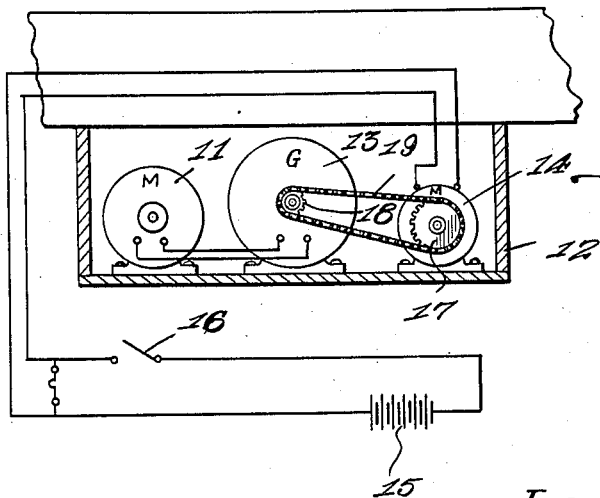
Joseph Botka, Jr.
INVENTOR
BY Victor J. Evans
ATTORNEY Patented Feb. 10, 1931

1,791,707

UNITED STATES PATENT OFFICE

JOSEPH BOTKA, JR., OF TRENTON, NEW JERSEY

ATTACHMENT FOR AEROPLANES

Application filed September 13, 1929. Serial No. 392,405.

The present invention contemplates the provision of a safety attachment for aeroplanes or the like, and embodies a plurality of propellers mounted upon the wing of the plane and operated by electric motors, and adapted to be called into use should the engine of the plane become disabled, or cease to operate from any cause whatsoever.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views, and wherein:

Figure 1 is a front elevation of an aeroplane embodying the invention.

Figure 2 is a side elevation partly in section.

Figure 3 is a fragmentary view partly in section showing the relative arrangement of the parts.

Referring to the drawing in detail A indicates generally an aeroplane of ordinary well known construction, wherein the wing is indicated at B and the main propeller at C.

In accordance with the present invention I contemplate the use of auxiliary propellers 10 each of which is supported directly beneath the wing B adjacent one end thereof as illustrated in Figure 1. Each propeller is carried by the shaft of an electric motor 11 mounted within a suitable housing 12 beneath the wing B. Also arranged within this housing is a generator 13 and a similar electric motor 14. The housing 12 may be constructed of any suitable material, although the front wall is preferably foraminated as illustrated to minimize air resistance. A source of current for the motor 14 is indicated at 15, and it will be noted upon inspection of Figure 3 that the circuit for the motor 14 includes a switch 16 of any suitable type. Carried by the shaft in the motor 14 is a sprocket wheel 17 over which and a similar sprocket wheel 18 carried by the shaft of the generator, is trained an endless chain 19. The motor 11 is connected in circuit with the generator 13, while also included in circuit with the motor 14 is a danger signal including a lamp casing 20 having a red lens 21. This lamp casing is mounted in the bottom of the machine and is illuminated when the auxiliary propellers are called into use, thereby giving notification to others that the motor of the particular machine so equipped is impaired.

When the main propeller C of the aeroplane is rendered inoperative as a result of engine trouble, or for any other reason, the pilot closes the switch 16 to complete the circuit to the motor 14. This motor operates the generator 13, which is connected in circuit with the motor 14, and the latter motor is operated to actuate the propeller 10 associated therewith. Consequently these propellers are used to assist the pilot in bringing the plane to a safe landing, and may also be used to propel the machine for a considerable length of time until such a landing place is available.

While it is believed that from the foregoing description, the nature and advantages of the invention will be readily apparent, I desire to have it known, that I do not limit myself to what is herein shown and described and that such changes may be resorted to when desired as fall within the scope of what is claimed.

What is claimed is:

A safety attachment for aeroplanes comprising an auxiliary propeller mounted beneath the wing of the machine, an electric motor for said propeller, a generator connected with said motor, an electric circuit, a second motor included in said circuit, means for operating the generator from the last mentioned circuit, and a signal lamp included in said circuit and arranged to be viewed from the bottom of the machine.

In testimony whereof I affix my signature.

JOSEPH BOTKA, JR.